July 16, 1935. M. WITTMANN Re. 19,649
TOY NURSING BOTTLE
Original Filed Jan. 27, 1931
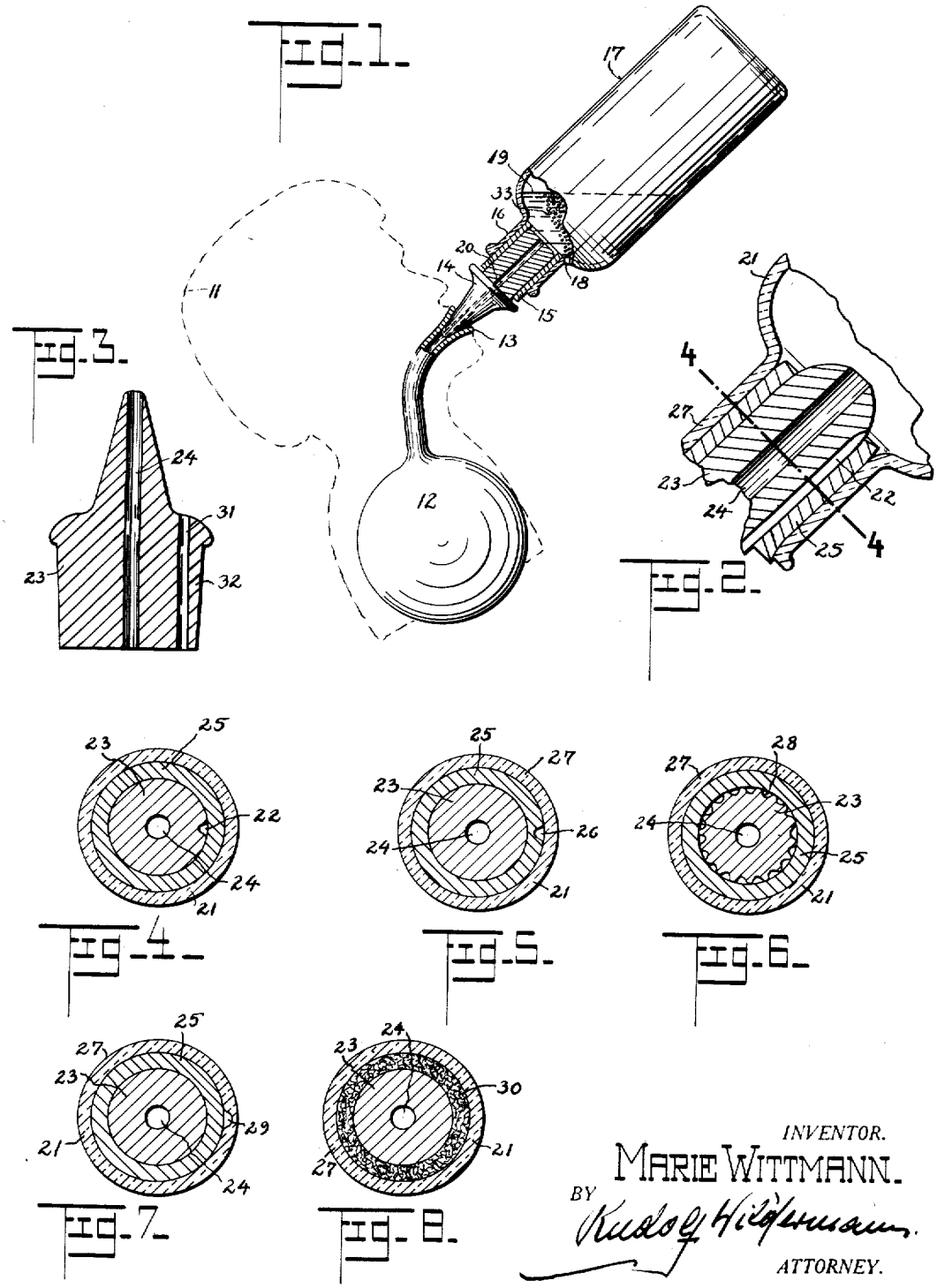
INVENTOR.
MARIE WITTMANN.
BY Rudolf Hilgermann.
ATTORNEY.

Reissued July 16, 1935 Re. 19,649

UNITED STATES PATENT OFFICE 19,649

TOY NURSING BOTTLE

Marie Wittmann, New York, N. Y.

Original No. 1,859,485, dated May 24, 1932, Serial No. 511,499, January 27, 1931. Application for reissue May 24, 1934, Serial No. 727,335

4 Claims. (Cl. 46—40)

My invention concerns a nursing bottle and in particular the means employed in connection therewith, which facilitate the emptying of such a bottle.

The principal object of this invention is to simulate in a toy the nursing of an infant by suitably relating the pressures in the toy nursing bottle and in the suction means.

It is a further object of my invention to admit air to the nursing bottle at a very slow speed while suction is applied thereto from the toy simulating the baby to be nursed.

Another object of my invention is to simulate by means of an auxiliary opening in a toy nursing bottle the admission of air, as it is brought about from the nipple during the real nursing operation.

A further object of my invention is to simulate by the admission of air to the bottle through an auxiliary opening, the suckling noise.

A further object of my invention is to provide an auxiliary opening in a nursing bottle, the admission of air through which may be adjusted and which thereby permits a variation in the speed of operation of the toy by a variation in said opening.

Other objects of my invention will become apparent from the perusal of the following specification and of the appended drawing in which Figure 1 shows, in a partly sectioned side view, the arrangement of a toy nursing bottle, as applied to a toy mammal equipped with sucking means.

Figure 2 shows a sectional side view of the inlet of my improved bottle.

Figure 3 shows a cross-sectional side view of a modified stopper, as used with my improvements.

Figure 4 shows a cross-section through the neck of the bottle of Figure 2.

Figures 5, 6, 7 and 8 show, in similar views, various modifications of my invention.

Similar numerals refer to similar parts throughout the various views.

The doll 11 shown in Figure 1 is equipped with pneumatic means 12 which are hidden upon the inside of the doll and which issue from the doll through the mouth thereof, through an outlet 13. By compression or release, the pneumatic means 12 push the contents of the pneumatic means out through the outlet 13, or suck in whatever is applied to said mouth. The pneumatic means are preferably elastic where they extend through the mouth at the outlet 13 so that the nipple 14 of the bottle may be tightly inserted thereinto.

By means of an elastic bushing 15 the nipple 14 fits tightly into the neck 16 of the toy nursing bottle 17. A small opening 18 is provided in the bottle at the base of the neck. The opening 18 in the bottle neck is so disposed that when the elastic nipple is inserted into said neck and thereby compressed the inner end of the nipple may be adjusted to wholly uncover said opening or partially close the same, thereby regulating the amount of air entering the bottle so as to control the suction and consequent flow of liquid from the bottle as the means 12 expands.

When the toy nursing bottle is brought into an operative position and suction is applied thereto by means of the pneumatic means 12, air will enter through the opening 18 into the bottle and will rise in the form of small bubbles 33, through the liquid 19, which is drawn from said bottle through the fine hole 20 longitudinally extending from the nipple or plug 14 into the outlet 13 of the pneumatic means.

The toy nursing bottle 21 of Figure 2 is not provided with an opening in said bottle but a slot or groove 22 is provided upon the side of the plug 23, air entering upon said bottle through the groove 22 from the outside of the bottle, while the liquid contained in the bottle is being evacuated through the opening 24 in the plug by means of the suction means applied to the outer end of the plug. The tapered plug 23 is fitted into the neck of the bottle 21 by means of an elastic sleeve 25, which extends more or less into the groove 22 according to whether the plug is pushed more or less tightly into the neck of the bottle. Thus the cross-section of the groove 22 may be made larger or smaller and the speed of the evacuation of the bottle may thus be regulated, that speed depending to a large measure upon the speed at which air can pass through groove 22 into the bottle.

In order to bring about a variation of the cross-section of the groove 22, either the plug 23 may be tapered, or the inside of the neck 27 or the sleeve 25, or a pair or all of these parts.

In the modification of Figure 5 a groove 26 is shown in the elastic means 25, instead of being shown in the plug 23. In this instance also, the cross-section of the groove 26 may be varied by a more or less tight insertion of the plug 23 into the neck 27 of the bottle.

It is not necessary that an outspoken groove is provided upon the outside of the plug as shown in Figure 4. Admission of air to the bottle between the plug 23 and the sleeve 25 may be caused by various kinds of irregular shaping of the surface of the plug. Thus for instance, a plurality of longitudinal ridges 28 may be provided upon the plug, which provide a plurality of small openings through which air may enter upon the bottle. Such ridges may equivalently be provided upon the inside or outside of the sleeve 25 instead of being provided upon the circumference of the plug 23.

In the modification of Figure 7, I show a groove 29 extending from the outside into the bottle longitudinally upon the inside of the neck 27 of said bottle. By a setting of plug 23, the elastic means of sleeve 25 may be pushed more or less into the groove 29, thus making the cross-section of the groove 29 smaller or larger.

In the modification of Figure 8, I show porous elastic means 30 as a sleeve extending between the plug 23 and the neck of the bottle 27. They may be made of any kind of a sponge through which air may pass between the plug 23 and the neck 27 and the amount of air which can pass therethrough may be regulated by a more or less tight fitting of the plug 23 into the neck 27 of the bottle.

When the plug is elastic, or fits the neck of the bottle in such manner that it retains its position therein, the sleeve 25 may be dispensed with; a plug of that kind is shown in Figure 3. An auxiliary opening 31 extends through the length of the plug and serves in this instance for the admission of air. The tapering of the circumference of the plug is more accentuated in this instance, as shown at 32. When the plug is elastic, the cross-sections of the openings 24 and 31 are varied according to whether the plug is pushed more or less tightly into the neck of the bottle.

The hole, through which the air is let into the bottle, is arranged in such proximity of the outlet opening, that it is submerged under the contents of the bottle substantially as long as said outlet opening is submerged under said contents for the purpose of withdrawing the contents from the bottle, it appearing to the observer that bubbles, arising from said inlet through the contents of the bottle, issue from said outlet opening.

At the same time the outlet and inlet openings are so far removed from each other, that the air entering through said inlet is not drawn into said outlet by the contents issuing from the bottle through the outlet.

While I have shown and described my invention with some degree of particularity, it will be realized that other modifications and changes may be resorted to under special conditions. I therefore do not wish to be limited and restricted to the exact details shown and described but reserve the right to make such changes and modifications as may fairly fall within the scope of the subject matter now being claimed.

What is claimed is:

1. In a toy, a body member having a mouth opening, a receptacle situated within said member and connected with said opening, a bottle having an elongated neck, a plug within said neck, said plug fitting into said opening, and an elastic sleeve surrounding said plug, there being a relative taper between said neck and said plug and sleeve, and a part of said sleeve and said neck combining to form an air passage leading into the interior of said bottle with the size of said passage being regulated by the extent of insertion of the plug into said neck and by the relative taper between the latter elements.

2. A nursing device comprising, in combination, a bottle having a neck portion, an elastic nipple provided with a central portion having an opening extending therethrough, said nipple and neck portion being tapered relative to each other and one of said portions having a groove formed in a wall thereof which combines with the other portion to form an air vent communicating with the interior of the bottle, and said nipple being more or less compressed by the extent of its insertion into said neck portion and the relative taper between said nipple and neck portion to force the walls of said groove toward each other to vary the cross-sectional area of said vent and thereby regulate the amount of air passing therethrough.

3. A nursing device comprising, in combination, a bottle having a neck portion, and a nipple consisting of a central plug portion having an opening extending therethrough and an elastic sleeve portion surrounding said plug portion, there being a relative taper between said nipple and neck portion and said nipple being insertable into and engaging said neck portion so that said sleeve portion will be compressed thereby, one of said portions having a groove therein which combines with another of said portions to form an air vent extending through said nipple, the insertion of said nipple into said neck portion and the relative taper between the latter elements forcing the walls of said groove toward each other to thereby regulate the size of said air vent.

4. A nursing device comprising, in combination, a bottle having a neck portion, an elastic nipple provided with an opening therethrough, said neck portion and nipple being tapered relative to each other and one of said parts having a groove therein with converging walls which combine with the other part to form an air vent the size of which is affected, due to the relative taper between said parts, by the extent of insertion of the nipple into said bottle neck.

MARIE WITTMANN.